(12) United States Patent
Siracusa

(10) Patent No.: US 9,990,630 B2
(45) Date of Patent: Jun. 5, 2018

(54) PLATFORM AND METHOD FOR ANALYZING THE PERFORMANCE OF MESSAGE ORIENTED MIDDLEWARE

(71) Applicant: MASTERCARD INTERNATIONAL INCORPORATED, Purchase, NY (US)

(72) Inventor: Paul Siracusa, Wildwood, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 891 days.

(21) Appl. No.: 14/263,019

(22) Filed: Apr. 28, 2014

(65) Prior Publication Data

US 2015/0310401 A1 Oct. 29, 2015

(51) Int. Cl.
*G06F 15/16* (2006.01)
*G06Q 20/40* (2012.01)
(Continued)

(52) U.S. Cl.
CPC ..... *G06Q 20/4016* (2013.01); *G06F 11/3419* (2013.01); *G06F 11/3495* (2013.01); *H04L 67/2809* (2013.01); *G06F 11/323* (2013.01); *G06F 2201/87* (2013.01); *G06F 2201/875* (2013.01); *H04L 43/0852* (2013.01);
(Continued)

(58) Field of Classification Search
CPC ............ G06F 2201/86; G06F 2201/87; G06F 11/3452; G06F 11/323; G06F 11/3419; G06F 9/5083; G06F 2201/875; G06F 11/3495; H04L 67/1029; H04L 41/0631; H04L 41/5032; H04L 43/0864; H04L 67/2809; H04L 43/50; H04L 43/16; H04L 43/0852; H04L 67/22; G06Q 10/1091; G06Q 10/10; G06Q 20/208; G06Q 20/4016
USPC ...... 709/224, 202, 219, 245; 705/23, 39, 17; 370/253, 466
See application file for complete search history.

(56) References Cited

U.S. PATENT DOCUMENTS 7,051,339 B2 * 5/2006 Deverill .............. G06F 11/3419
709/202
2002/0107743 A1 * 8/2002 Sagawa .................. G06Q 10/10
705/17

(Continued)

*Primary Examiner* — Jungwon Chang
(74) *Attorney, Agent, or Firm* — Harness, Dickey & Pierce, P.L.C.

(57) ABSTRACT

A computer server platform application for analyzing a capability of a message oriented transaction system. The platform application includes a first server having a performance driver utility for sending a plurality of transactions through a queue manager as messages having a payload and a correlation identification. The performance driver utility calculates and records a completion time for each transaction sent. A backend utility within the first server is for receiving each transaction sent, converting each payload into a reply message, and sending the reply message to a reply queue destination. A graphing utility contained within the first server is for displaying the completion time for each transaction and an average number of transactions per unit of time for a total number of transactions tested. The performance driver utility is further for displaying categories of possible transaction delays and resolutions of the delays.

19 Claims, 9 Drawing Sheets

(51) Int. Cl.
*H04L 29/08* (2006.01)
*G06F 11/34* (2006.01)
*H04L 12/26* (2006.01)
*G06F 11/32* (2006.01)

(52) U.S. Cl.
CPC .............. *H04L 43/16* (2013.01); *H04L 43/50* (2013.01); *H04L 67/22* (2013.01)

(56) References Cited

U.S. PATENT DOCUMENTS

| | | | |
|---|---|---|---|
| 2007/0043861 A1* | 2/2007 | Baron | H04L 41/0631 709/224 |
| 2008/0071906 A1* | 3/2008 | Thoennes | G06F 9/5083 709/224 |
| 2014/0372285 A1* | 12/2014 | Bryant | G06Q 10/1091 705/39 |
| 2015/0039456 A1* | 2/2015 | Kobres | G06Q 20/208 705/23 |
| 2015/0222516 A1* | 8/2015 | Deval | H04L 67/1029 370/253 |

* cited by examiner

PLATFORM AND METHOD FOR ANALYZING THE PERFORMANCE OF MESSAGE ORIENTED MIDDLEWARE

FIELD

The present disclosure relates to analyzing the performance of message oriented middleware, particularly in financial transaction systems handling real-time transactions.

BACKGROUND

This section provides background information related to the present disclosure which is not necessarily prior art.

The use of message oriented middleware, such as WebSphere®MQ available from IBM®, for processing financial transactions, essentially in real-time, is known and integral to the efficiency, reliability, and robustness of the transaction system. Message oriented middleware essentially acts as a conduit between a sending application and a receiving application for a transaction. There are a variety of features and parameters that can affect the performance of message oriented middleware. Such features include a type of bindings used (local, client), a size of a message (1 KB, 2 MB), a persistence of the message (storing message in memory or disk), a queue manager used, a request queue location, a reply queue, location, an encryption type used, a thread count used, and processes started during transactions.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

The use of message oriented middleware in systems, especially in the financial sector, requiring essentially real-time transactions is known. The performance of this middleware is an important part of the overall speed, reliability, and efficiency of conducting financial transactions, such as those made at point-of-sale (POS) locations with credit and debit cards. A common example of a message oriented middleware offering is WebSphere® MQ, available from IBM®, though the example embodiments described may be implemented with other middleware offerings.

The exemplary embodiments of a computer platform application described below allow a user, such as a system administrator, to analyze and test the performance of the middleware, especially the speed of completing transactions under various system configurations. The computer platform application may be implemented on any operating system, such as Unix® or Windows®. Java® and associated application programming interface (API) toolkits, such as Swing™ are useful in creating a graphical user interface (GUI) and result display screens, such as performance graphs. The choice of computer platforms for implementing the exemplary application described below is a matter of design choice and is influenced by the operating system upon which the application will be used.

Figure 1:
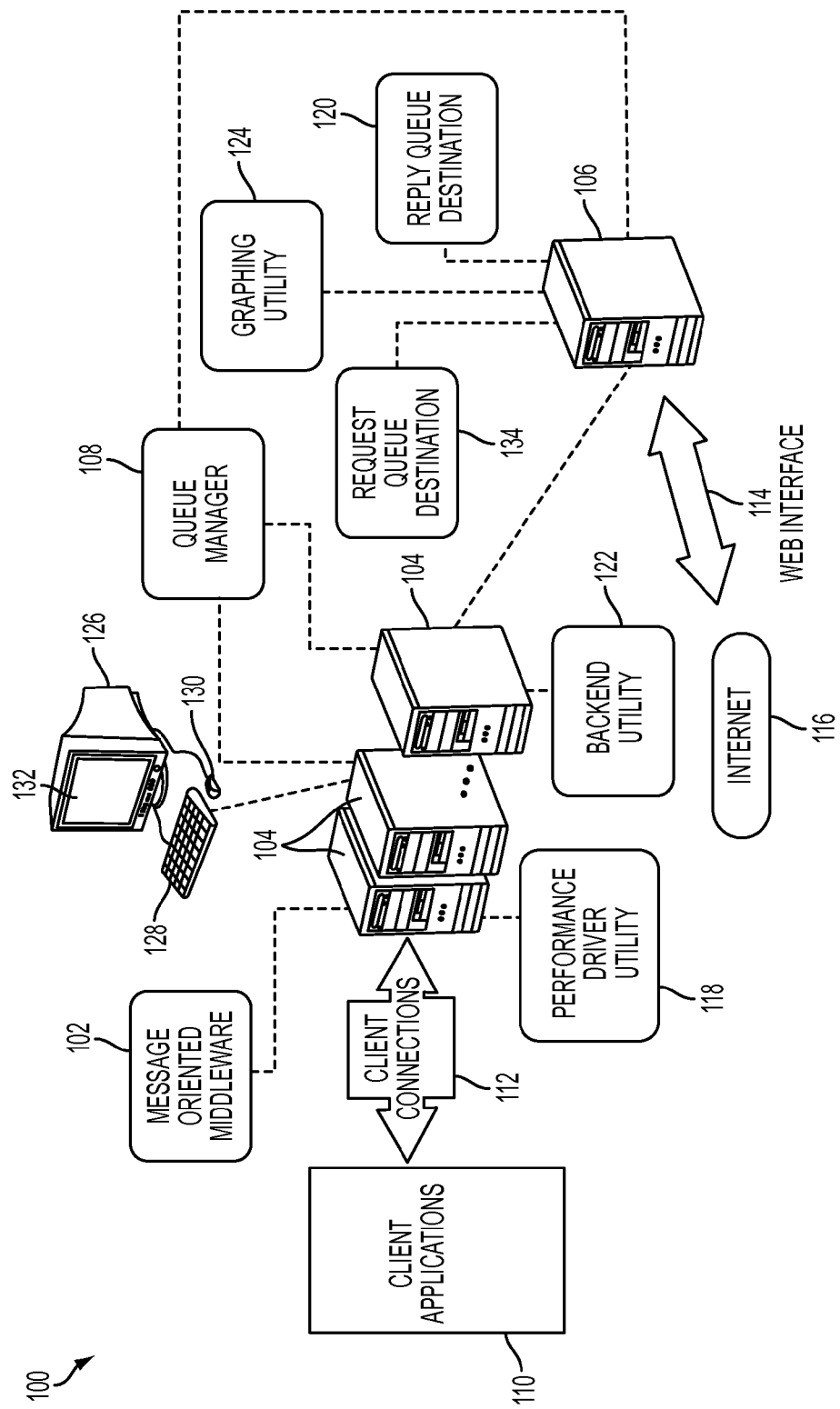
FIG. 1 is an exemplary system for use with possible embodiments of a computer platform application.

FIG. 1 shows an exemplary message oriented transaction system 100, that includes message oriented middleware 102 contained within one or more servers 104, 106.

Servers may be a series or bank of servers such as shown at 104 or may be a single server as at 106. Further, the servers 104, 106 may be configured in various ways such as clusters or hub-spoke, as is known. Still further, as an example, servers 104 may include queue managers 108 connected to client applications 110 via client connections 112; or server 106 may include queue manager 108 and also applications within server 106 that are connected to clients via a connection such as a web interface 114 to the internet 116. A server or a collective group of servers include software and suitable computer hardware, such as one or more processors and associated devices (e.g. memory, storage drives, disks, or tapes, power supplies, and various client connection paths and ports). The term server is intended to be broad and in accord with generally known definitions of the term. For example, as used in this disclosure, the terms "first server" and "second server" may mean a single general purpose computer, a single processor and associated devices and software dedicated as a server, a single dedicated server with multiple processors, or a group of computer servers with many processors and associated software and devices.

The dashed lines of FIG. 1 show only some of the possible connections between the various parts of the system and are not intended to show the only possible connections. For example, queue manager 108 may be included in one or more of servers 104 or in server 106 or in all of the servers. Similarly, other parts of the system may be embodied in one or more of the servers 104, 106 and not all possible connections are shown.

An example computer server platform application for analyzing a capability of a message oriented transaction system 100 includes a first server 104 and/or 106 having computer-executable instructions embodied in the first server defining a performance driver utility 118. The performance driver utility 118 is for sending a plurality of transactions through the queue manager 108 as messages having at least a payload and a correlation identification. The payload and correlation identification are further described below.

The performance driver utility 118 configures the first server 104, 106 to calculate and record, in a non-transitory computer readable media, a completion time for each transaction sent. Each completion time starts when the performance driver utility 118 sends a transaction and ends when the performance driver utility 118 receives a reply message with a matching correlation identification at a reply queue destination 120.

A backend utility 122 is contained within the first server 104, 106 and configures the first server 104, 106 to receive each transaction sent, convert each payload into the reply message, include the matching correlation identification in the reply message, and send the reply message to the reply queue destination 120.

A graphing utility 124 is contained within the first server 104, 106 as computer-executable instructions for displaying the completion time for each transaction and an average number of transactions per unit of time for a total number of transactions tested. The completion times and average number of transactions may be displayed on computer display 126 that is connected to servers 104, 106. The average number of transactions per unit of time for all the transactions tested may be expressed as transactions per second (TPS), while transaction times for each transaction may be displayed in milliseconds. The computer display 126 also may have associated input devices such as keyboard 128, mouse 130, touch-screen 132, or other suitable man-machine interface.

The system 100 may also display categories of possible transaction delays based on where, in a sequence of the total number of transactions tested, the delays occur. The system 100 may also display potential resolutions for each category of possible transaction delay. In this way, a user may analyze the performance of the middleware within the system 100 and determine possible corrective actions that may be taken to improve the performance. That is the platform may allow a user to increase the speed of completing the transactions, as evidenced by an increase in TPS subsequent to implementation of one or more corrective actions and a follow up test. Specific examples of categories of possible transaction delays and their possible resolutions are given below with reference to FIG. 8.

Figure 2:
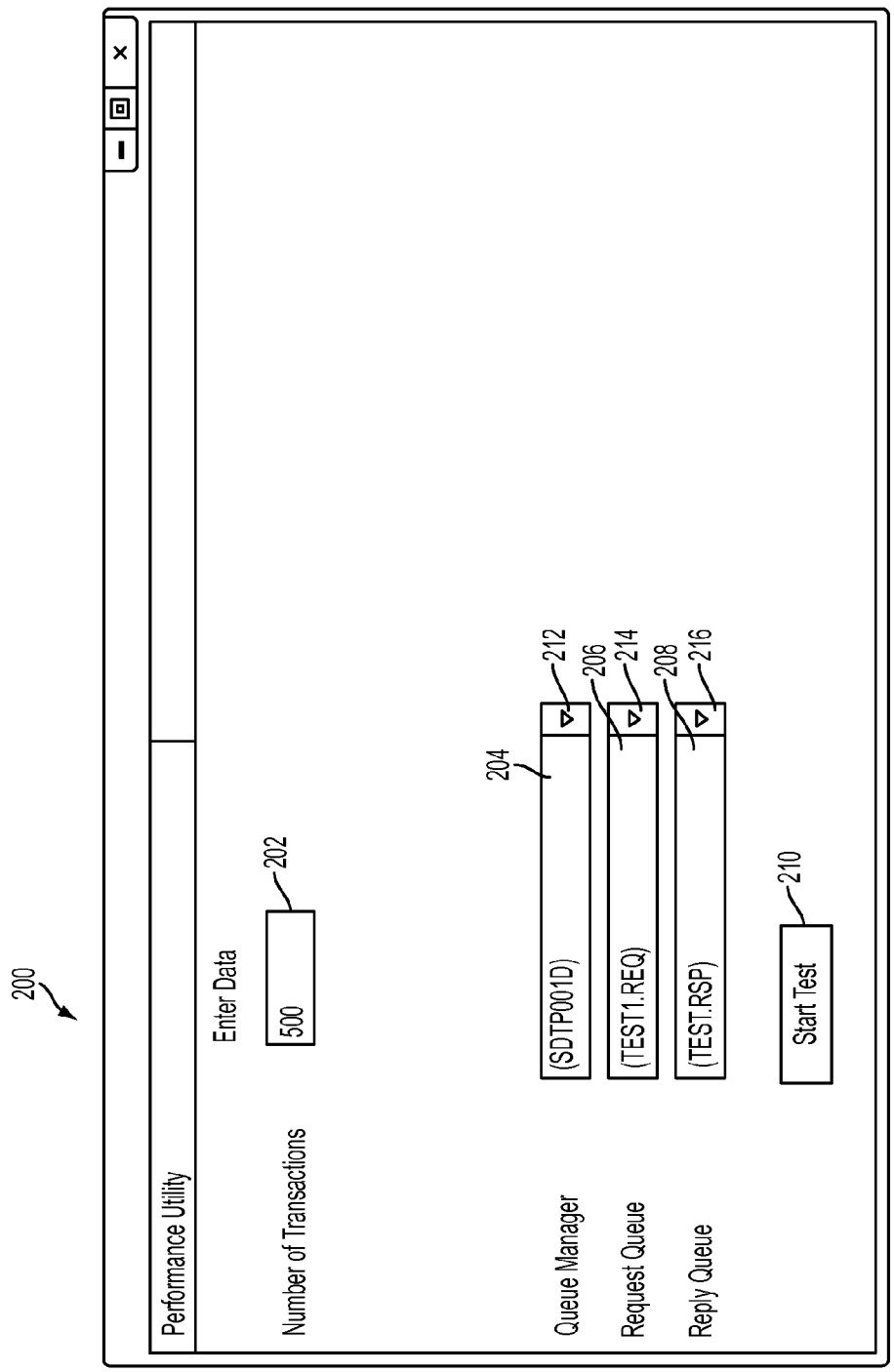
FIG. 2 is an exemplary input screen shot for an embodiment of a first portion of the computer platform application.

The performance driver utility 118 is configured to display input windows 202-208, shown in screen-shot 200 of FIG. 2. The input windows 202-208 are for receiving data from a user defining at least a number of transactions to be run for a test at input window 202, the queue manager program 108 at input window 204, a request queue destination (shown at 134 in FIG. 1) at input window 206, and the reply queue destination 120 at input window 208.

The number of transactions to be tested is entered at window 202 in this example is 500. The number of transactions to be tested must be greater than zero. A transaction may be described as a unit of processing consisting of one or more application programs, affecting one or more objects, that is initiated by a single request. So each transaction entered into window 202 may represent multiple program executions. A basic unit of program execution may be referred to as a thread, which is a stream of computer instructions in control of a process. Several threads may run concurrently, performing different jobs or executions for each transaction. In the example of FIG. 2 a number of threads available may be set by the performance driver utility 118 and may be for example 10 (the number of threads must be greater than zero). A total number of transactions tested is expressed as the number of transactions in window 202 multiplied by the number of threads set by the performance driver utility 118; in this example the total number of transactions tested is 500×10 or 5000. To begin a test, the input window 210 is clicked-on or touched.

The queue manager 108 is a system program that provides queuing services to applications. Queue manager 108 provides an API allowing applications to put transactions, embodied as messages, on and get messages from one or more queues. More than one queue manager 108 may be running on a single system so the available queue managers 108 may be displayed in a dropdown menu (not shown) when the dropdown button 212 is selected. If a binding is set by the utility as Local then the dropdown button 212 will show all the queue managers 108 available, such as in servers 104 and/or 106. If the binding is set as Client the input window 204 becomes editable and the user may be required to enter the queue manager 108 details manually if executing an application on a remote system, as in the example in FIG. 1 where client applications 110 are remote from servers 104.

The request queue destination 134 is a queue at the identified destination for receiving sent messages. The messages reside within the queue manager 108. After the queue manager 108 is selected or entered at window 204 a number of available queues will be populated in the dropdown window 206 and they may be selected using button 214.

Similarly, the reply queue destination 120 is a queue at the identified destination for receiving replies from the backend utility 118. After the queue manager 108 is selected or entered the queues available will be populated in the dropdown window 208 and they may be selected using button 216.

FIG. 2 shows an example with a minimum amount of inputs from a user to configure the parameters of the test. The disclosure below provides examples of enabling a user greater ability to configure a test's parameters. In the example of FIG. 2 such parameters as a number of threads, a payload size, a persistence, a bindings type, a server location and connection path, and security settings may all be preset by the application. Granting a user the ability to input more data to change the parameters of a test, as in the examples below, may provide a user with tools that provide for greater granularity in analyzing the system and determining where and why the most significant transaction delays are occurring.

Figure 3:
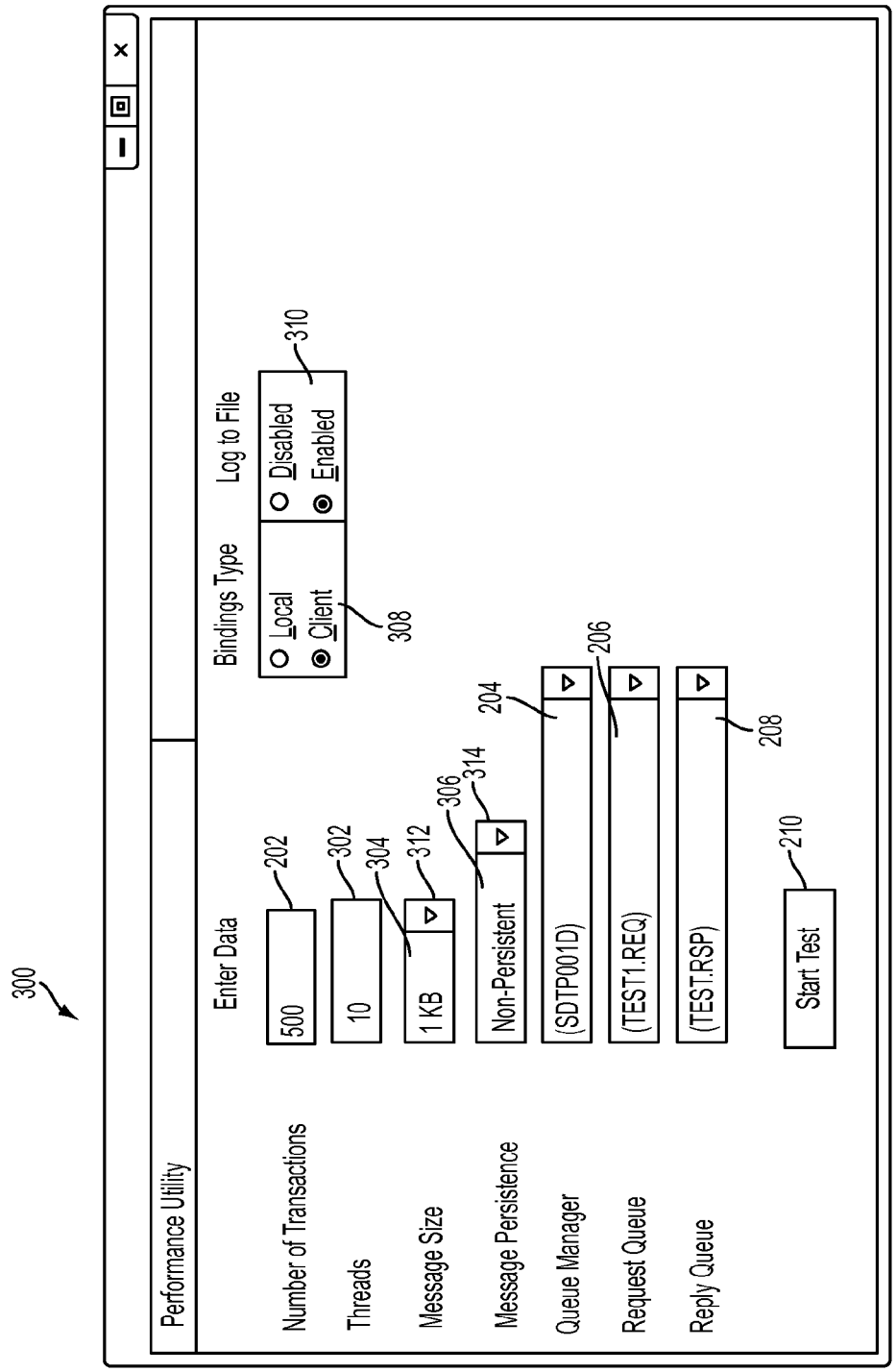
FIG. 3 is another embodiment of FIG. 2.

Screen-shot 300 of FIG. 3 is similar to FIG. 2 but includes further input windows 302-310. Input window 302, in contrast to the example of FIG. 2, allows a user input a number of threads available for handling the transactions. In general, the more threads the more concurrency (ability to process transaction simultaneously) and therefore the better the performance. However, there is a point of diminishing return on performance as the number of threads becomes large as the runtime management of the threads adversely affects the performance. The number of threads made available is a significant factor in the performance of the system.

Input window 304 allows the user to select a payload or message size to be selected from a list of options. The payload size options may be displayed by selecting dropdown button 312 and may be for example 1 kilobyte (KB) or 2 megabytes (MB). These message payload sizes are contained within the middleware and replicated in the performance driver utility.

There are two options for the persistence of the messages selected at window 306. The first option is shown and is non-persistent and indicates that the messages are stored in memory. The other option (not shown) and selected via dropdown button 314 is persistent and indicates that the messages are written to disk or other storage media. Requiring messages to be saved to disk may degrade transaction handling performance compared to only holding message in memory.

Window 308 allows the user to select a bindings type of local or client and was explained above. A Local binding indicates that the queue manager 108 resides on the same server 104, 106 as the applications and the applications will not initiate a transmission control protocol (TCP) connection to a queue manger 108 port to communicate. Client indicates that the middleware API will be used and the queue manager 108 is either on a remote server or that the queue manager 108 will communicate via transmission control protocol/internet protocol (TCP/IP) sockets on a local server 104, 106. An example of when the client binding may be chosen is when an application through which the plurality of transactions will be sent is on a second server (i.e. a remote server) and the defined bindings type causes a transmission control protocol/internet protocol connection path to be formed with the queue manager program 108.

Window 310 allows the user to enable or disable a log-to-file parameter for recording the performance statistics to disk. Obviously, not recording the statistics to disk would increase the speed of handling transactions.

Figure 4:
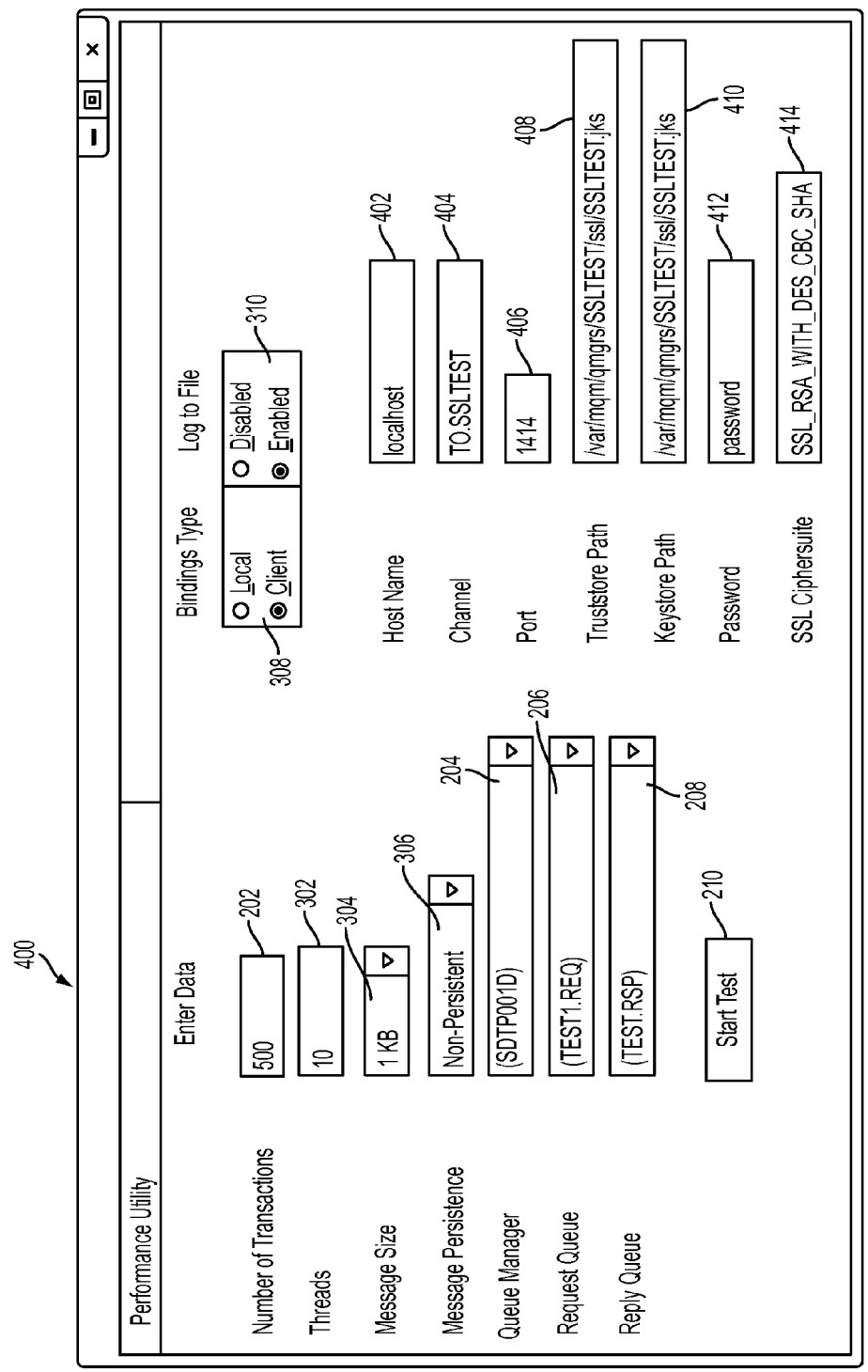
FIG. 4 is still another embodiment of FIG. 2.

The performance driver utility may provide further input windows, as shown screen-shot 400 in FIG. 4, for receiving data from the user identifying a server location and connection path for communication with the queue manager program 108. The input windows identifying the server location and connection path may include input windows 402-414. Window 402 receives data identifying the hostname, which is the domain name system (DNS) or internet protocol (IP) address of the server with the queue manager 108. Channel information is received in window 404 and indicates the server channel defined on the queue manager. The TCP/IP port, if any, is identified in window 406 and is the port the queue manager 108 is active on. A truststore path is identified in window 408 and contains a location of certificates from other parties that the middleware may expect to communicate with, or from Certificate Authorities that is trusted to identify other parties. A keystore path is identified in window 410 and contains a location of private keys, and the certificates with their corresponding public keys. The password for access to the keystore is received in window 412. Window 414 receives a secured sockets layer (SSL) cipher suite specification that matches a CipherSpec of the server connection channel for the queue manager 108.

Figure 5:
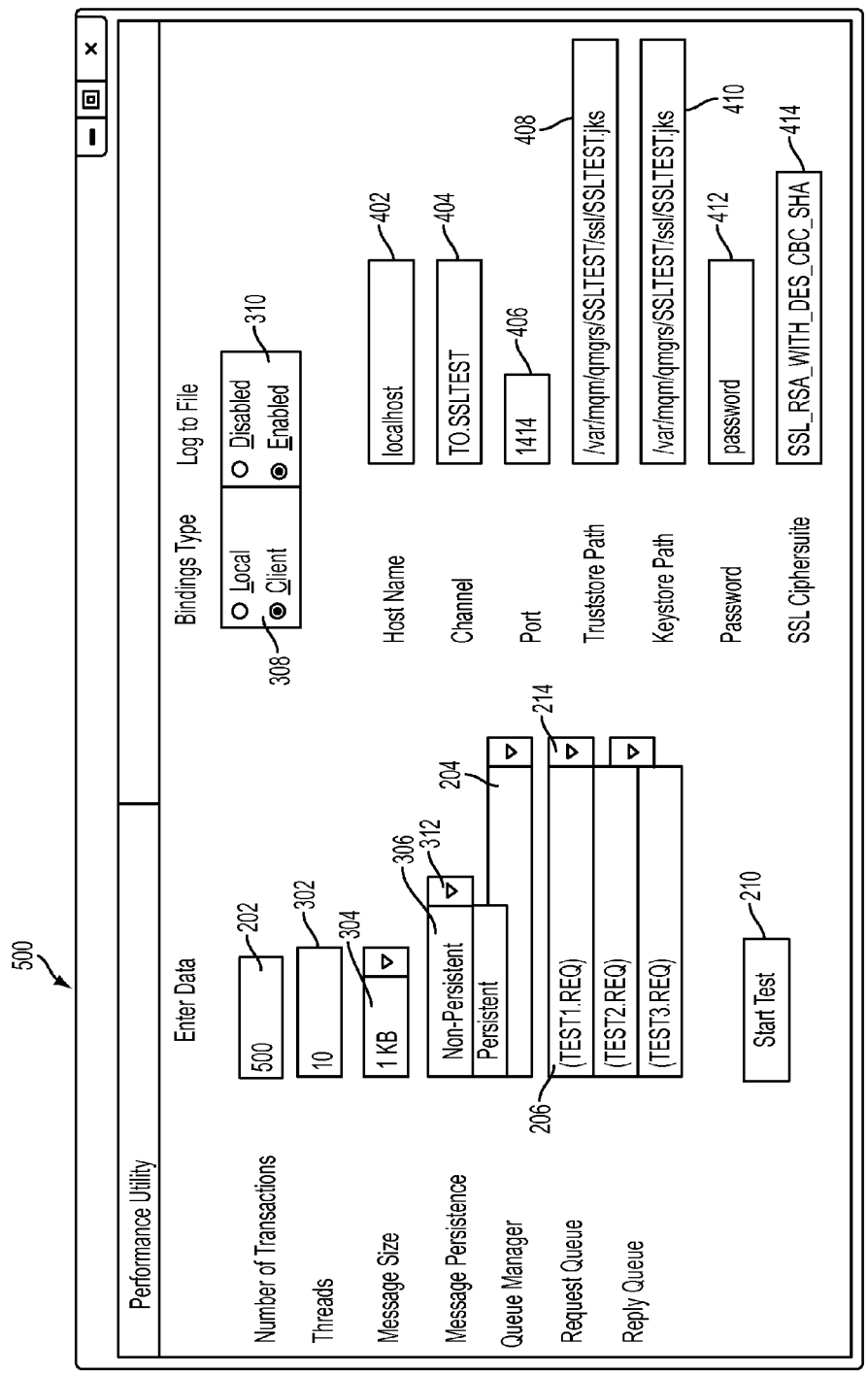
FIG. 5 is an exemplary input screen shot showing the use of pull-down windows.

FIG. 5 is a screen-shot 500 and is the same as FIG. 4, except that examples of dropdown menus being displayed are shown for persistence window 306 and request queue window 206. The dropdown menu for window 306 is displayed by clicking on button 312 and the menu for window 206 is displayed by clicking on button 214. It is understood that both menus will typically not be visible simultaneously but are shown for illustrative purposes only.

Figure 6:
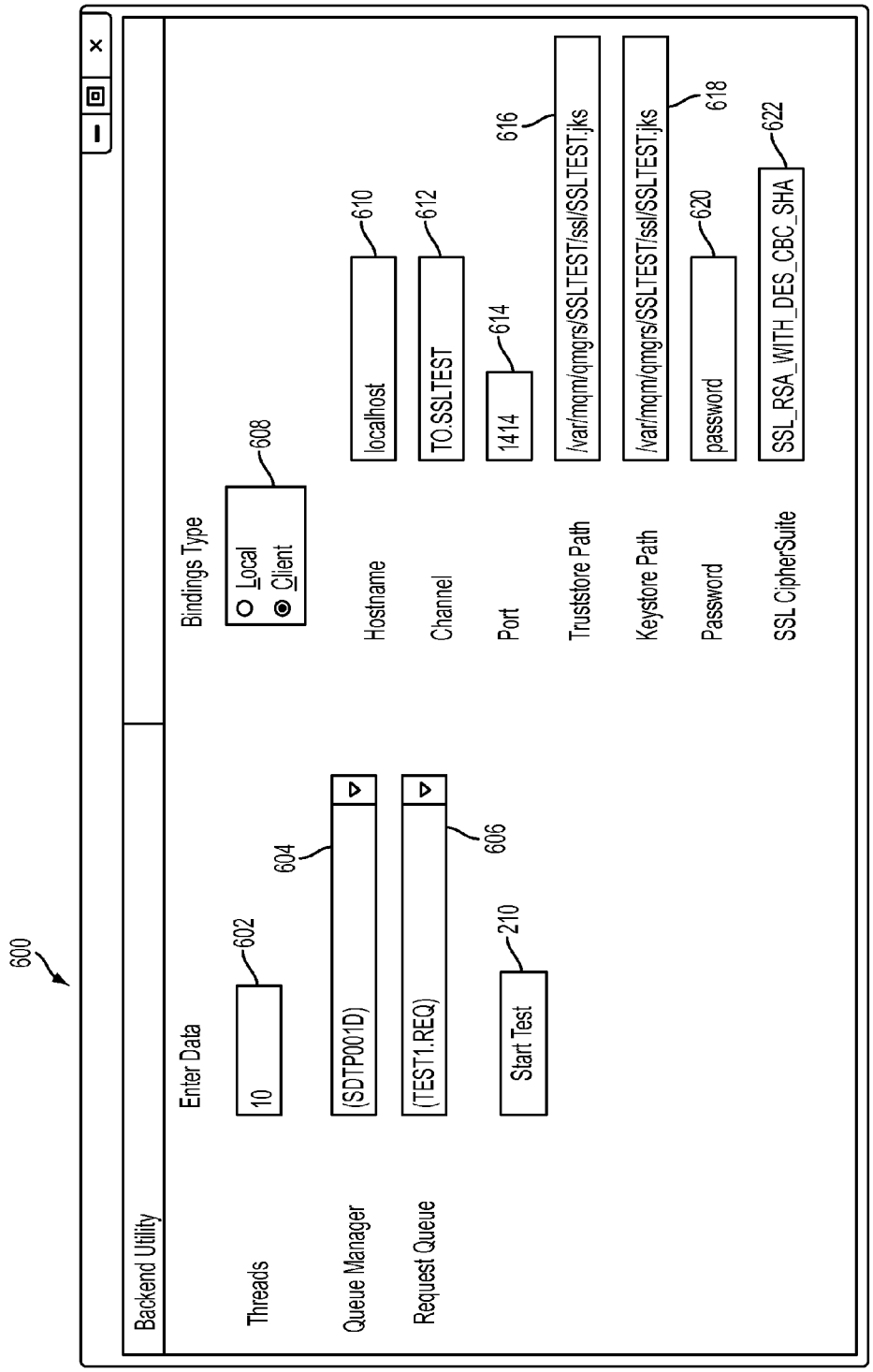
FIG. 6 is an exemplary input screen shot for an embodiment of a second portion of the computer platform application.

FIG. 6 is a screen-shot 600 of an example backend utility 122 of the platform application. The backend utility may receive data configuring how the backend utility 122 handles request messages received from the performance driver utility. Window 602 establishes a number of threads created for reading the messages received. The number of threads must be greater than zero. The queue manager and request queue are identified in windows 604 and 606, respectively. The information in windows 604 and 606 must match the information in corresponding windows 204 and 206 of the driver performance utility. The window 608, similarly to window 308 described above, selects a Local or Client binding. If the backend utility is on the same server as the queue manager a Local binding will be selected. If the backend utility is on a server remote from the queue manager or a TCP/IP socket connection is to be tested a Client binding will be selected. Windows 610-622 correspond to windows 402-414 and the information in each window should match the information in its corresponding window. Via screen-shot 600, backend utility 122 is configured to display input windows for receiving data from a user defining at least a one of a number of threads executable for each transaction, the queue manager program, a request queue destination, a bindings type, and a server location and connection path for communication with the queue manager program. The data received from the user in the backend utility is the same as information received in the performance driver utility.

Figure 8:
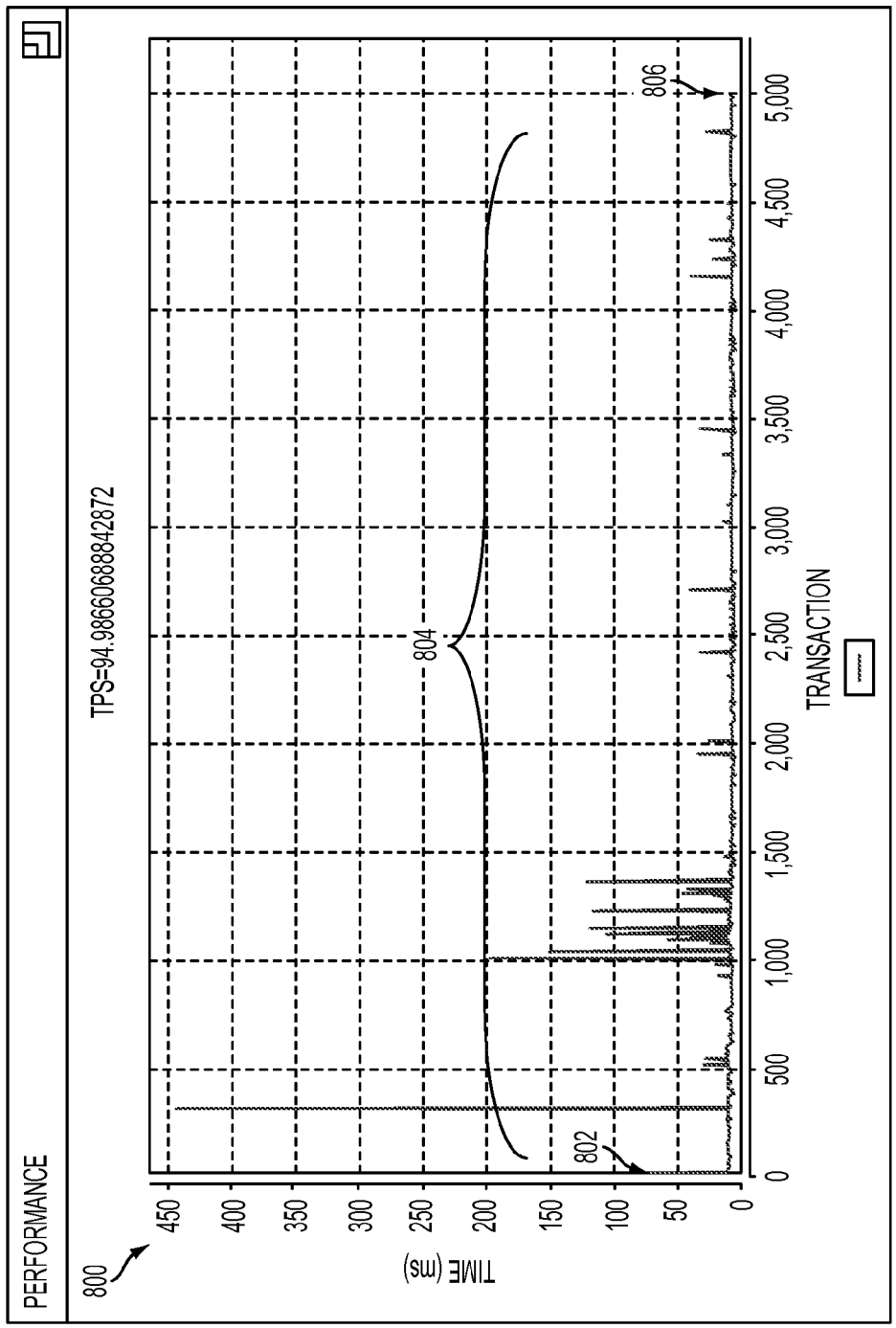
FIG. 8 is an exemplary graph that may be displayed by an embodiment of the computer platform application.

The graphing utility 124 stored in the first server 104, 106 may display a completion time for each transaction tested and an aggregate TPS, as shown in FIG. 8. FIG. 8 is a plot of each of the 5000 transactions tested in the example versus the completion time, in milliseconds, for each test transaction to be completed. The TPS was calculated using the formula of TPS=(number of threads*number of transactions)/(aggregate time for all tested transaction in seconds), which in the example of FIG. 8 is 94.98660688842872 transactions per second.

Categories of possible transaction delays includes delays at a start of the test 802, delays at multiple points throughout the test, shown generally at 804, delays at an end of the test 806, and a low average number of transactions per unit of time for the total number of transactions tested. Exactly what constitutes a low average TPS will depend upon the configuration of the system and the resources allocated to processing the transactions.

If the graph 800 shows spikes at the start of the test, at 802, the platform application may display the possible reasons for the delays and resolutions as follows:

Possible Reasons for Start Delays
1. If the utilities have been written in Java™, startup times are typically much slower compared to other languages for various reasons, but mostly because there are a significant number of classes that must be loaded from disk prior to execution.
2. If Websphere® MQ is the middleware and TCP/IP connections are to be tested, then these connections are logically defined as channel objects. These channel objects are manifested as processes that need to be started when the first transactions are executed.
3. If SSL is used, the initial channel negotiation uses asymmetric encryption where identity is checked and verified before switching to symmetric encryption. Asymmetric encryption is significantly slower than symmetric encryption.

Resolution.

The potential resolution for the delays at the start of the test includes priming the system by executing the performance driver utility once. Any of the above can cause additional latency at the beginning of a batch, however if you prime the system by executing the performance driver one time, the java classes will cache themselves in memory and the channels will start up and switch to symmetric encryption at which point you execute successive tests with better initial performance.

If the graph 800 shows spikes at multiple points throughout the test, as shown generally at 804, the platform application may display the possible reasons for the delays and resolutions as follows:

Possible Reasons for Delays During a Test
1. Unrelated operating system or application processes (monitors, backups, etc.) have initiated and are causing contention for resources such as CPU, memory, or disk.

Resolution.

The potential resolution for the delays at multiple points throughout the test includes terminating unnecessary processes started during the test and restarting the test.

The system should be checked for superfluous processes started during a test. If Unix is being used, monitoring commands such as topas, vmstat or sar may be effective in identifying such superfluous processes.

If the graph 800 shows spikes at the end or a test, as indicated at 806, or for a low TPS, the platform application may display the possible reasons for the delays and resolutions as follows:

Possible Reasons for Delays at End of a Test or Low TPS
1. As more traffic is sent, messages are accumulating on the request or reply queue because of poor performance.

Resolution.

The potential resolutions for the delays at the end of the test and for the low average number of transactions per unit of time for the total number of transactions tested include increasing a number of threads available for each transaction, using non-persistent messages, creating test logs and test queues on different disks, using simpler encryption algorithms, and creating messages with smaller payloads per message.

Figure 7A:
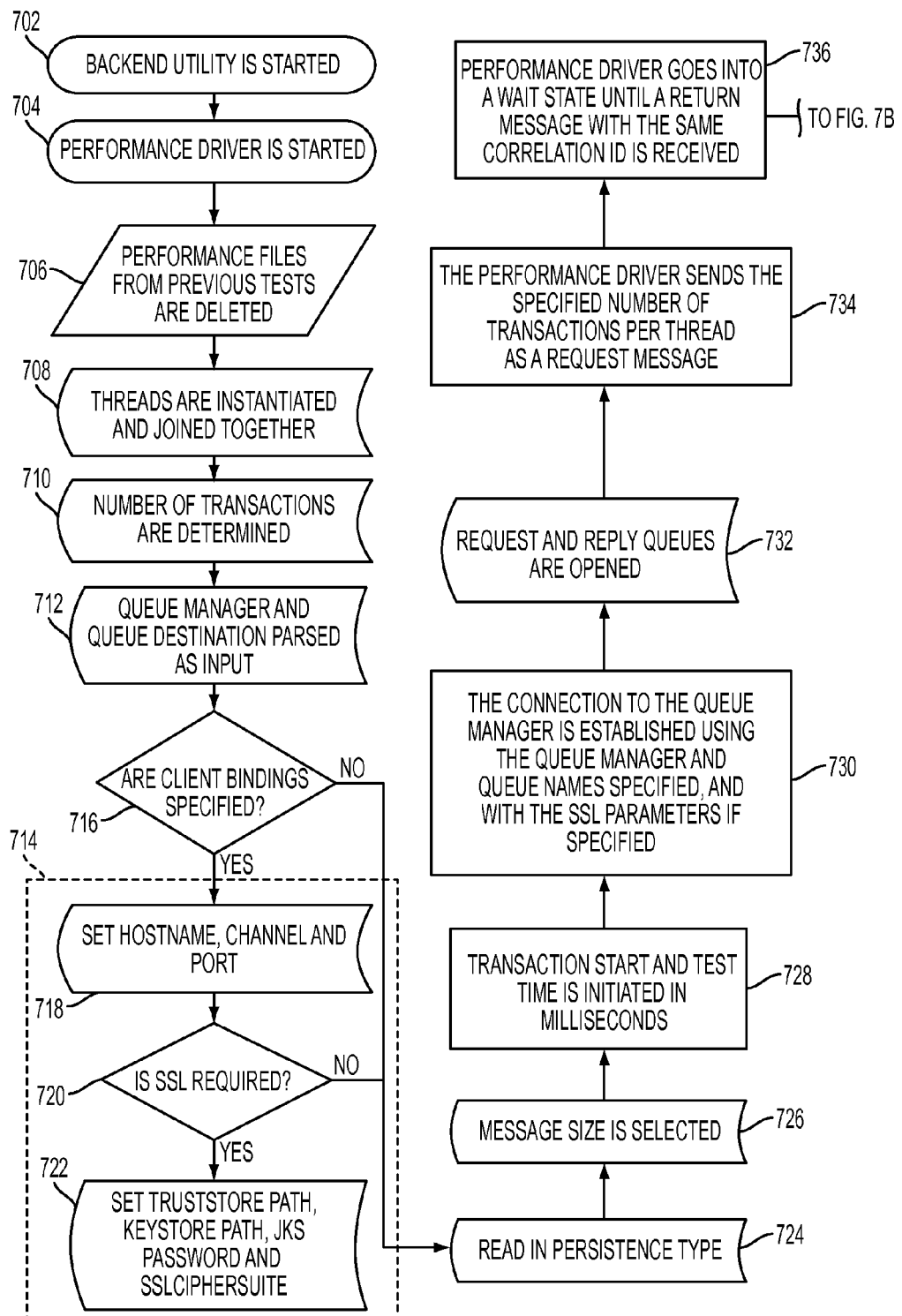
FIGS. 7A-7B are a flowchart of an exemplary logic flow for an embodiment of the computer platform application.
Figure 7B:
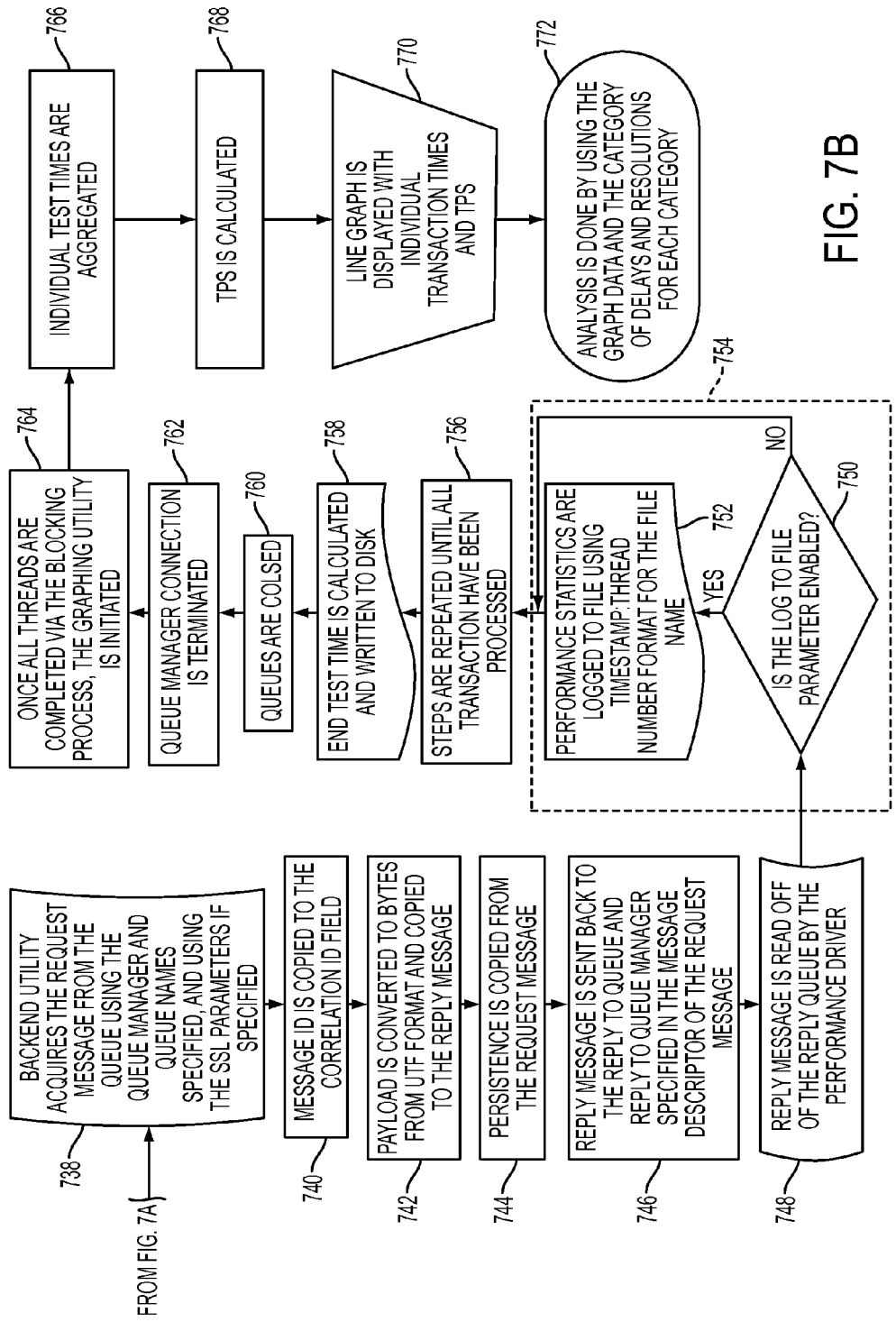

The flow chart of FIGS. 7A-7B illustrates a logic flow of an exemplary platform application and method.

A computer-implemented method for analyzing a capability of a message oriented transaction system includes the following. Running a performance driver utility 118 having computer-executable instructions on a first server 104, 106. The performance driver utility 118 sends a plurality of transactions through a queue manager 108 as messages, each message having at least a payload and a correlation identification. The performance driver utility 118 configures the first server 104, 106 to calculate and record, in a non-transitory computer readable media, a completion time for each transaction sent. Each completion time starts when the performance driver utility 118 sends a transaction and ends when the performance driver utility 118 receives a reply message with a matching correlation identification at a reply queue destination 120. A backend utility 122, having computer-executable instructions, is run on the first server. The backend utility 122 configures the first server 104, 106 to receive each transaction sent, convert each payload into the reply message, include the matching correlation identification in the reply message, and send the reply message to the reply queue destination 120. A graphing utility 124, having computer-executable instructions, is run on the first server 104, 106 as computer-executable instructions. The graphing utility 124 displays the completion time for each transaction and an average number of transactions per unit of time for a total number of transactions tested, as shown in FIG. 8. The platform application displays categories of possible transaction delays based on where in a sequence of the total number of transactions tested the delays occur. The platform application further displays potential resolutions for each of the categories.

FIG. 7A shows the backend utility and the performance driver utility being started at 702 and 704. Step 706 deletes performance files from previous tests. Step 708 instantiates threads and joins them together. Step 710 determines the number of transactions to be tested. Step 712 parses the queue manager and queue destinations as inputs displayed in the appropriate input windows, as disclosed above. If the bindings are set as Local, the steps within dashed line 714 are skipped and the logic continues to step 724. If Client bindings are specified at 716, step 718 sets a hostname, channel, and port. Step 720 determines if SSL is required and if yes, step 722 sets the truststore path, keystore path, the Java™ keystore (JKS) password, and the SSL CipherSuite.

If 720 is negative the logic continues at 724. Step 724 reads the persistence type. 726 sets the message payload size as selected. 728 sets each transaction start time and initiates a test start time. Step 730 establishes a connection to the queue manager 108 and the request and reply queue destinations specified and applies the SSL parameters specified. 732 opens the request and reply queues. Step 734 causes the performance driver utility 118 to send the specified number of transactions per thread. 736 forces the performance driver utility 118 into a wait state until a reply message with a matching correlation identification is received.

The logic continues, at FIG. 7B, where step 738 causes the backend utility to acquire the request message from the queue manager 108 and request queue destination specified with the SSL selected, if specified. 740 copies the request message identification including a matching correlation identification to the reply message. Step 742 converts the request message payload to bytes and copies the bytes to the reply message. Step 744 copies the persistence from the request message. 746 sends a reply message back to the reply queue destination 120 specified in the request message. 748 causes the performance driver utility 118 to read the reply message at the reply message destination 120. Step 750 determines if the log-to-file parameter is enabled and if yes, step 752 logs performance statistic to a specified disk. If step 750 is negative, the logic continues at 756. The dashed line 754 indicates an optional feature of the platform application and may be eliminated or provided without allowing a user to choose. Step 756 causes the above steps to be repeated until all the transactions of the test have been processed. Step 758 calculates an end test time and writes it to disk for each transaction. Step 760 closes the queues. Step 762 terminates the queue manager 108 connection. 764 initiates the graphing utility. Step 766 aggregates each individual transaction test time. Step 768 calculates the aggregate TPS. Step 770 causes the line graph 800 to be displayed, such as on display screen 132, showing individual transaction times and the TPS. Step 772 displays analysis of the test, including displaying the categories of possible transaction delays and the resolutions for each category of delay.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

It should be appreciated that one or more aspects of the present disclosure transform a general-purpose computing device into a special-purpose computing device when configured to perform the functions, methods, and/or processes described herein.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

What is claimed is:

1. A computer server platform application for analyzing a capability of a message oriented transaction system comprising:
    a first server including computer-executable instructions embodied therein defining a performance driver utility for sending a plurality of transactions through a queue manager as messages having at least a payload and a correlation identification;
    wherein the performance driver utility is configured to calculate and record, in a non-transitory computer readable media, a completion time for each transaction sent, wherein each completion time starts when the performance driver utility sends a transaction and ends when the performance driver utility receives a reply message with a matching correlation identification at a reply queue destination;
    wherein the first server includes computer-executable instructions embodied therein defining a backend utility, the backend utility configured to receive each transaction sent, convert each payload into the reply message, include the matching correlation identification in the reply message, and send the reply message to the reply queue destination;
    wherein the first server includes computer-executable instructions embodied therein defining a graphing utility, the graphing utility configured to display the completion time for each transaction and an average number of transactions per unit of time for a total number of transactions tested;
    wherein the computer server platform application is configured to display categories of possible transaction delays based on where in a sequence of the total number of transactions tested the delays occur and at least one potential resolution for each category of possible transaction delay;
    wherein the categories of possible transaction delays include delays at a start of the test, delays at multiple points throughout the test, delays at an end of the test, and a low average number of transactions per unit of time for the total number of transactions tested; and
    wherein the at least one potential resolution for the delays at the end of the test and for the low average number of transactions per unit of time for the total number of transactions tested includes multiple of: increasing a number of threads available for each transaction, using non-persistent messages, creating test logs and test queues on different disks, using simpler encryption algorithms, and creating messages with smaller payloads per message.

2. The computer server platform application of claim 1, wherein the performance driver utility is configured to display input windows for receiving data from a user defining at least a number of transactions to be run for a test, a queue manager program, a request queue destination, and a reply queue destination.

3. The computer server platform application of claim 2, including additional input windows for receiving data from the user defining at least one of a number of threads executable for each transaction, a message payload size, a persistence of the messages, a bindings type, and a status of a log-to-file parameter.

4. The computer server platform application of claim 3, including further input windows for receiving data from the user identifying a server location and connection path for communication with the queue manager program.

5. The computer server platform application of claim 4, wherein identifying the server location and connection path includes input windows for at least one of a hostname, a channel, a port, a truststore path, a keystore path, a password, and a secure sockets layer cipher suite.

6. The computer server platform application of claim 4, wherein an application through which the plurality of transactions will be sent is on a second server and the defined bindings type causes a transmission control protocol/internet protocol connection path to be formed with the queue manager program.

7. The computer server platform application of claim 3, wherein the log-to-file parameter configures the performance driver utility to save each completion time to a non-transitory computer readable storage location.

8. The computer server platform application of claim 1, wherein the backend utility is on a second server.

9. The computer server platform application of claim 1, wherein the backend utility is configured to display input windows for receiving data from a user defining at least a one of a number of threads executable for each transaction, the queue manager program, a request queue destination, a bindings type, and a server location and connection path for communication with the queue manager program, wherein the data received from the user in the backend utility is the same as information received in the performance driver utility.

10. The computer server platform application of claim 1, wherein the potential resolution for the delays at multiple points throughout the test includes terminating unnecessary processes started during the test and restarting the test.

11. A computer-implemented method for analyzing a capability of a message oriented transaction system, the method comprising:
   displaying input windows for receiving data from a user defining at least a number of transactions to be run for a test;
   sending, by a performance driver utility of a first server, a plurality of transactions through a queue manager as messages having at least a payload and a correlation identification, the plurality of transactions based on the number of transactions to be run for the test;
   calculating and recording, by the performance driver utility, in a non-transitory computer readable media, a completion time for each transaction sent, wherein each completion time starts when the performance driver utility sends a transaction and ends when the performance driver utility receives a reply message with a matching correlation identification at a reply queue destination;
   receiving, by a backend utility of the first server, each transaction sent, converting each payload into the reply message, include the matching correlation identification in the reply message, and sending the reply message to the reply queue destination;
   displaying, by a graphing utility of the first server, the completion time for each transaction and an average number of transactions per unit of time for a total number of transactions tested; and
   causing to be displayed, to a user, categories of possible transaction delays, based on where in a sequence of the total number of transactions tested the delays occur, and potential resolutions for each of the categories.

12. The method of claim 11, further comprising causing to be displayed a performance driver screen having input windows, and receiving data in the input windows defining at least a number of transactions to be run for a test, a queue manager program, a request queue destination, and a reply queue destination.

13. The method of claim 12, further comprising causing additional input windows to be displayed in the performance driver screen, and receiving data in the additional input windows defining at least one of a number of threads executable for each transaction, a message payload size, a persistence of the messages, a bindings type, and a status of a log-to-file parameter.

14. The method of claim 13, further comprising causing further input windows to be displayed in the performance driver screen and receiving data in the additional input windows defining a server location and connection path for communicating with the queue manager program.

15. A computer server platform application for analyzing a capability of a message oriented transaction system comprising:
   a first server including computer-executable instructions embodied therein defining a performance driver utility for sending a plurality of transactions through a queue manager as messages having at least a payload and a correlation identification;
   wherein the performance driver utility is configured to calculate and record, in a non-transitory computer readable media, a completion time for each transaction sent, wherein each completion time starts when the performance driver utility sends a transaction and ends when the performance driver utility receives a reply message with a matching correlation identification at a reply queue destination;
   wherein the first server includes computer-executable instructions embodied therein defining a backend utility, the backend utility configured to receive each transaction sent, convert each payload into the reply message, include the matching correlation identification in the reply message, and send the reply message to the reply queue destination;
   wherein the first server includes computer-executable instructions embodied therein defining a graphing utility, the graphing utility configured to display the completion time for each transaction and an average number of transactions per unit of time for a total number of transactions tested;
   wherein the computer server platform application is configured to display categories of possible transaction delays based on where in a sequence of the total number of transactions tested the delays occur and at least one potential resolution for each category of possible transaction delay;
   wherein the categories of possible transaction delays include delays at a start of the test and the potential resolution for the delays at the start of the test include priming the system by executing the performance driver utility once.

16. The computer server platform application of claim 15 wherein the performance driver utility is configured to display input windows for receiving data from a user defining at least a number of transactions to be run for a test, a queue manager program, a request queue destination, and a reply queue destination.

17. The computer server platform application of claim 16, further including additional input windows for receiving data from the user defining at least one of a number of threads executable for each transaction, a message payload size, a persistence of the messages, a bindings type, and a status of a log-to-file parameter; and
   further including further input windows for receiving data from the user identifying a server location and connection path for communication with the queue manager program; and
   wherein identifying the server location and connection path includes input windows for at least one of a hostname, a channel, a port, a truststore path, a keystore path, a password, and a secure sockets layer cipher suite.

18. The computer server platform application of claim 17, wherein the log-to-file parameter configures the performance driver utility to save each completion time to a non-transitory computer readable storage location.

19. The computer server platform application of claim 15, wherein the backend utility is configured to display input windows for receiving data from a user defining at least a one of a number of threads executable for each transaction, the queue manager program, a request queue destination, a bindings type, and a server location and connection path for communication with the queue manager program, wherein the data received from the user in the backend utility is the same as information received in the performance driver utility.

\* \* \* \* \*